No. 849,805. PATENTED APR. 9, 1907.
E. NYE & A. GRUESBECK.
ANTISLIPPING DEVICE FOR AUTOMOBILES.
APPLICATION FILED OCT. 11, 1906.
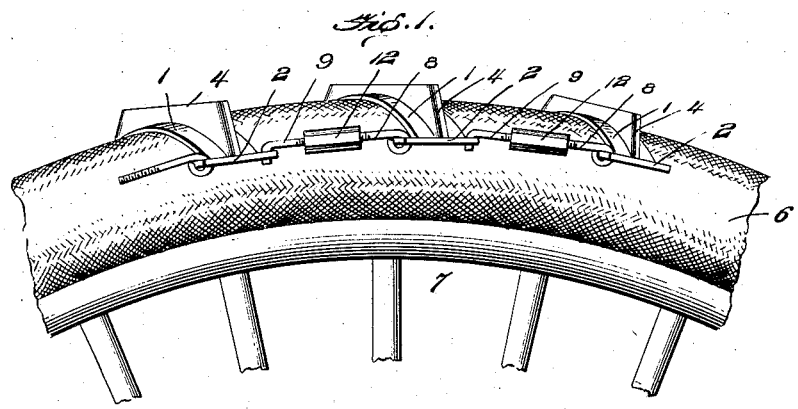
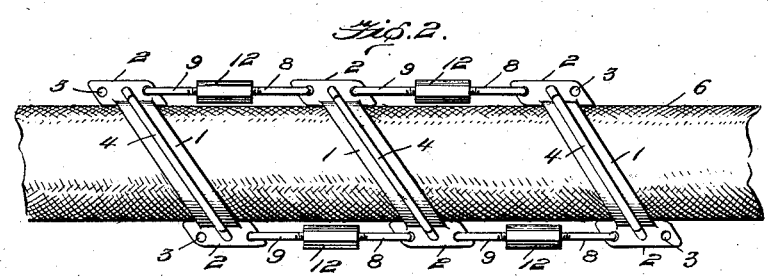
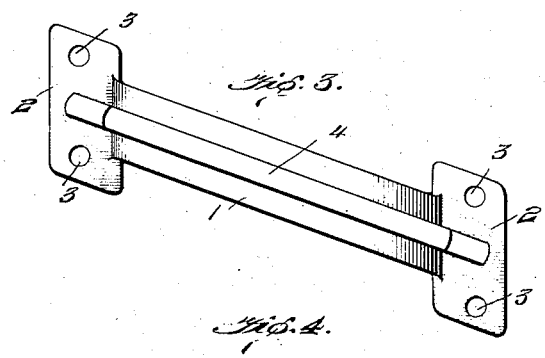
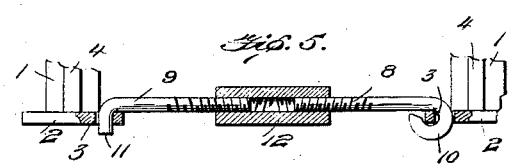
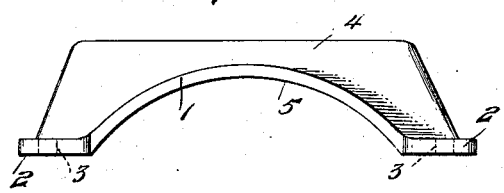
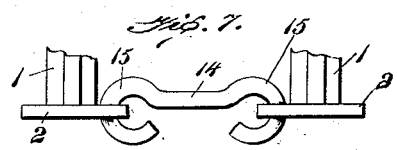
Witnesses
Inventors
Edward Nye and
Alonzo Gruesbeck.
By E. E. Vrooman,
their Attorney.

UNITED STATES PATENT OFFICE.

EDWARD NYE AND ALONZO GRUESBECK, OF CHARLOTTE, MICHIGAN.

ANTISLIPPING DEVICE FOR AUTOMOBILES.

No. 849,805.    Specification of Letters Patent.    Patented April 9, 1907.

Application filed October 11, 1906. Serial No. 338,522.

*To all whom it may concern:*

Be it known that we, EDWARD NYE and ALONZO GRUESBECK, citizens of the United States, residing at Charlotte, in the county of Eaton and State of Michigan, have invented certain new and useful Improvements in Antislipping Devices for Automobiles, of which the following is a specification, reference being had therein to the accompanying drawings.

This invention relates to improvements in antislipping devices for vehicle-wheels, and particularly the wheels of automobiles or horseless carriages.

The object of the invention is the peculiar construction of a shoe or gripping member which is to be attached to the pneumatic or cushioned tire of a wheel.

Another object of the invention is the provision of means for facilitating the passage of a vehicle over slippery or icy ground and in climbing or descending a grade.

With these and other objects in view the invention consists of certain novel constructions, combinations, and arrangements of parts, as will be hereinafter fully described and claimed.

In the drawings, Figure 1 is a fragmentary perspective view of an antislipping device positioned upon the tread of the tire of the wheel. Fig. 2 is a fragmentary top plan view of an antislipping device applied to a wheel as illustrated in Fig. 1. Fig. 3 is a top plan view of one of the shoe or gripping members employed in constructing the antislipping device, while Fig. 4 is a view in side elevation of one of the shoes. Fig. 5 is an embodiment, shown partly in longitudinal section, of the connecting means for the shoes or gripping members. Fig. 6 is another embodiment of the connecting means for the shoes, and Fig. 7 is still another embodiment of the connecting means.

Referring to the drawings by reference-numerals, 1 designates the body portion of the shoe or gripping member, which body portion is upwardly bowed, and its ends terminate in horizontal parallel flanges 2 2. Each flat flange 2 is provided, preferably, with a pair of vertical apertures 3 3, the apertures 3 being formed upon opposite sides of a vertical reinforcing-rib 4, which rib is integral with the body 1 and said flanges 2. The rib 4 extends longitudinally of the body portion 1 and transversely of the flanges 2, thereby greatly strengthening said flanges 2. The body portion 1 is provided with a smooth inner surface 5, which surface conforms to the shape of the tread of the tire 6. The body portion 1 and rib 4 are formed at an obtuse angle to the parallel flanges 2, whereby the shoe is positioned at an obtuse angle to the tire 6 of the wheel 7. An important and material advantage is obtained by the peculiar structure and positioning of the shoes or gripping members, because while the rib 4 of each shoe is capable of gripping the ground as the wheel revolves, the same as if said shoe was positioned transversely of the wheel, still the rib 4 is lifted easily out of the ground, because the antislipping device has somewhat of a screw action in engaging and disengaging the ground when the wheel is revolved. Our shoes or gripping members are not synchronously lifted off of the ground, as would be the case if they were positioned transversely of the tire, but are gradually lifted from one end to the opposite end, thereby obviating the bodily lifting of the entire shoe or shoes, which would cause a strain upon the device in many cases—as, for instance, if the vehicle was traveling in mud.

In the accompanying drawings we have shown different embodiment of the connecting means for joining the shoes together, which connecting means also serve to retain or attach the shoes to the tire.

Referring to Fig. 5, the attaching device comprises bolts 8 and 9. The bolt 8 is provided, preferably at one end, with a loop 10, while its opposite end is screw-threaded. The bolt 9 is provided at one end with a hook 11, while its opposite end is also screw-threaded. Upon the screw-threaded ends of the bolts 8 and 9 is a rotatably-connecting member or turnbuckle 12. The bolt 9 is preferably permanently secured within an aperture 3 of a flange 2, while the hook 11 is removably secured within an aperture 3 of the flange 2 of another shoe. By reason of this structure of the connecting or coupling device a pair of shoes can be quickly connected, and if all of the shoes of the antislipping device are connected upon the tire the inner faces 5 of the body portions 1 of the shoes can be caused to tightly clamp or grip the tread of the tire by adjusting one or more of the turnbuckles 12. It is to be noted that in the embodiment depicted in Fig. 5 we have provided adjustable attaching means for connecting each two of the shoes and also that this attaching or coupling means constitutes an adjustable locking device for holding the shoes upon the tread and also causing said shoes to tightly grip the same.

In the embodiment depicted in Fig. 6 each two contiguous shoes are connected by a plurality of links 13. The links constitute a short chain, which is positioned away from the tire by reason of the flanges 2 2. It is to be noted that the chains in this instance are not positioned below the rim of the wheel 7. It will be obvious that by removing a link the chain can be tightened, or, vice versa, a link added for increasing the size of the antislipping device.

In the embodiment depicted in Fig. 7 a single link 14 is employed for connecting each two shoes or gripping members at each end. This link 14 is provided, preferably, with a straight body and with loops 15 15, formed at its ends.

What we claim is—

1. The combination with a wheel, of a shoe carried by said wheel, said shoe comprising a body portion, flanges formed at the end of said body portion, a rib extending longitudinally of the body portion and transversely of said flanges and integral with said body portion and flanges.

2. The combination with a wheel, of a shoe carried by said wheel, said shoe comprising a body portion provided with flanges, a rib integral with said flanges and body portion, each flange provided with apertures formed upon opposite sides of said rib, and means for securing said shoe upon said wheel.

3. A device of the character described, comprising shoes, each shoe comprising a body provided at its ends with flat, horizontal flanges, a rib integral with said body and flanges and extending longitudinally of the body and transversely of the flanges, each flange provided with vertical apertures formed upon opposite sides of said rib, and coupling means positioned within the apertures of the flanges of all of said shoes.

4. A device of the character described, comprising shoes, each shoe comprising a body provided at its ends with integral horizontal flanges, a rib integral with said flanges and body, each flange provided with vertical apertures formed upon opposite sides of said rib, and a pair of coupling devices for each two contiguous shoes, each device comprising bolts and a turnbuckle threaded thereon, each bolt provided with a hooked end positioned within a vertical aperture of a flange.

5. A device of the character described, comprising a body provided with horizontal flanges, each flange provided with vertical apertures, coupling devices for each two contiguous shoes, each of said coupling devices comprising bolts, one of said bolts provided with a looped end positioned in one of the vertical apertures of a flange, the other bolt provided with a hook positioned within a vertical aperture of the flange of another shoe, and said hook adapted to be quickly lifted from its engagement with said flange, and a turnbuckle threaded upon the contiguous ends of said bolts.

6. A device of the character described, comprising shoes, means connecting said shoes, each shoe comprising a longitudinally-curved body terminating at its ends in horizontal flanges, a rib integral with said body and flanges and extending contiguous to the outer edges of said flanges, and said flanges provided with apertures formed upon opposite sides of said rib.

7. A device of the character described, comprising shoes, means connecting all of said shoes, each shoe comprising a curved body terminating at its ends in flat flanges; a rib integral with said body and flanges and terminating near the outer edges of said flanges, said rib provided with an upper, straight, horizontal tread edge, and each flange provided with an aperture near each end.

8. As a new article of manufacture, a shoe for an antislipping device formed from a single piece of material, and comprising a body provided with parallel, flat flanges, the body formed at an obtuse angle to said flanges, a reinforcing-rib integral with the flanges and body, and each flange provided with a pair of vertical apertures.

In testimony whereof we hereunto affix our signatures in presence of two witnesses.

EDWARD NYE.
ALONZO GRUESBECK.

Witnesses
G. D. BLASIER,
T. D. SNOW